Figure 1:
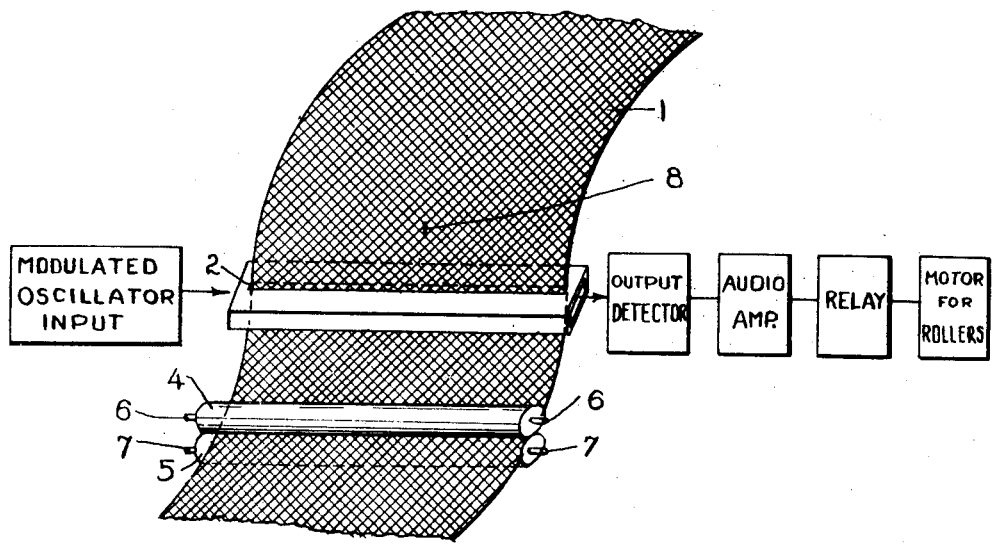

Dec. 28, 1948.  C. L. LISKOW  2,457,695
ULTRA HIGH FREQUENCY APPARATUS FOR INSPECTION
OF SHEET AND OTHER MATERIALS
Filed Sept. 24, 1945

INVENTOR.
Charles L. Liskow
BY
Laurence Burns,
ATTORNEY

Patented Dec. 28, 1948

2,457,695

UNITED STATES PATENT OFFICE 2,457,695

ULTRA HIGH FREQUENCY APPARATUS FOR INSPECTION OF SHEET AND OTHER MATERIALS

Charles L. Liskow, Danvers, Mass., assignor to Sylvania Electric Products Inc., Salem, Mass., a corporation of Massachusetts Application September 24, 1945, Serial No. 618,151

1 Claim. (Cl. 26—70)

This invention relates to methods and apparatus for detecting needles and other foreign bodies, moisture and the like in materials such as cloth, paper and similar materials.

I have found that when a sheet of such material is passed through a waveguide, the presence of any small object of metal or the like, such as part of a needle, will cause enough change in the attenuation of the waveguide as to be easily detected. The waveguide is preferably narrow in the direction of passage of the material, and the wavelengths with which the guide is best used are extremely small, for example one centimeter, although even shorter wavelength may be used. In fact the sensitivity of the device increases as the wavelength is decreased.

Heretofore, the detection of broken needles and the like, embedded in cloth coming from a knitting machine or similar device has been quite difficult, yet the passage of such an object through the pressing rolls through which the material eventually travels is quite destructive of the rolls, requiring very expensive repairs to the surface of the rolls.

My invention may be used to automatically stop the travel of the cloth to the rolls when a needle or a small part of one is present in the cloth thus preventing damaging to the rollers and also locating the position of the needle, which will be as close to the waveguide of my device as the inertia of the machine in stopping will allow.

A feature of my invention is a slotted waveguide through which the cloth or other material to be tested may pass, and other features are an oscillator feeding into one end of the waveguide, and detecting equipment at the other end. For a fixed oscillator input to the guide, and a given material passing through the slot, the output will have a definite value. If a small metal object such as a needle goes through the slot with the material, the output of the guide will be changed. This change can be used to detect the metal piece in the cloth, to stop the mechanism for moving the material, and for other purposes. The oscillator may ordinarily be modulated before being coupled to the guide, and a detector, for example a crystal, coupled to the output end of the guide. An audio amplifier may be used after the detector, to build up the current to a value convenient for operation of a relay, which may be used to stop the mechanism causing travel of the cloth.

Other objects, features and advantages of the invention will be apparent from the following specification, taken in connection with the accompanying drawings.

Figure 2:
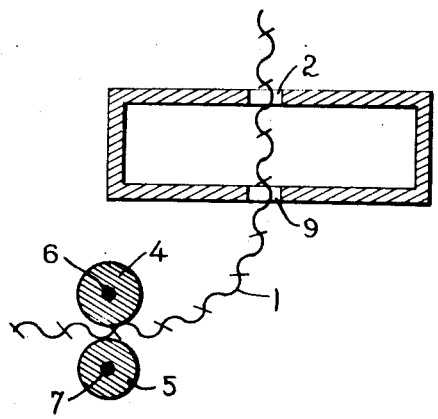

Figure 1 shows a schematic arrangement of the apparatus, with block diagrams of the electrical input and output system; and Figure 2 shows a schematic profile view of the waveguide of Figure 1 and some of the associated apparatus.

In Figure 1 the cloth 1 is shown being drawn through the slot 2 in waveguide 3 by the rollers 4 and 5, capable of rotation on their axes 6 and 7. A small metal needle 8 is shown embedded in the cloth for detection. The needles embedded in practice will not necessarily have the same orientation as the one shown. Waveguides are well known, and the slots 2 and 9 are preferably in the longitudinal direction, so that a wide surface of cloth 1 may be accommodated. The guide is preferably short in the direction of travel of the cloth, and may conveniently be rectangular in cross-section.

The modulated input from an ultra high frequency oscillator is fed into the waveguide by being coupled thereto at one end in a convenient manner. After passing through the guide longitudinally to its other end, the output is coupled to a detector, which may be a crystal type, an audio amplifier and a relay operating out of the amplifier. When the cloth alone is passing through the waveguide 2, the energy passed will have a particular value and when the needle 8 is in the guide the attenuation will be greater and less energy will be passed. The relay may be adjusted to remain closed when the cloth alone is passing, and to open when the energy passed is reduced by presence of a needle. If the relay contacts are in the circuit of the motor rotating the rollers 4 and 5 the cloth will stop in its travel when a needle 8 is carried into the guide. If the inertia of the rollers and associated equipment is great, the cloth may carry the needle somewhat out of the waveguide before the travel of the cloth stops, but the distance which the needle travels from the waveguide on operation of the relay can be determined by trial. The cloth's travel should be arranged to stop before the time necessary to carry the needle from the waveguide to the roller.

Of course, the relay can be used for other purposes than stopping the travel of the cloth. The cloth may merely be passed through the guide with the relay arranged to actuate a signal, such as a light or a bell, when a needle is detected. An operator watching for this can then find the needle and remove it.

The apparatus shown is particularly useful for locating broken needles and the like in cloth after being knitted or woven, but may be used for other similar purposes. The device may also be used to detect and measure the presence of moisture in the cloth, because a wet cloth will have greater attenuation in the guide 2 than will a dry one.

Instead of a modulated wave input and an audio frequency amplifier, a pulsed or continuous wave input may be used, with a video amplifier.

The waveguide shown is of hollow metal, but it may sometimes be desirable to use a waveguide of dielectric material in some cases. Polystyrene is useful for this purpose.

Although in the foregoing specification I have used the word "attenuation" to describe the drop in the energy transmitted through the waveguide when the needle or the like passes therethrough, I have not used the word in its strict sense because the wave is not actually attenuated in the sense of having a loss of power, but is merely reflected so that it does not reach the output end of the waveguide.

Although I have generally referred to sheet materials in this application, other types of material can be used, for example, such as flour, meal and the like which could be flowed through the apparatus.

My device is more sensitive when the slot is at the middle of the guide as shown in the figures. If a narrow piece of cloth, string, or other material is to be tested, the slot or hole in the waveguide may of course be smaller and may even be a small circle.

What I claim is:

Apparatus for detecting foreign conductive matter in textiles, comprising an ultra high frequency oscillator, a waveguide coupled thereto and having a longitudinal slot, rollers for passing textiles through said slot, a motor for rotating said rollers, a detector coupled to the output of said waveguide, an amplifier therefor, and a relay for stopping said motor, said relay being operated by said amplifier when conductive material passes through said slot.

CHARLES L. LISKOW.

REFERENCES CITED

The following references are of record in the file of this patent:

UNITED STATES PATENTS

| Number | Name | Date |
| --- | --- | --- |
| 1,827,349 | Bing | Oct. 13, 1931 |
| 2,301,251 | Capen | Nov. 10, 1942 |
| 2,395,560 | Llewellyn | Feb. 26, 1946 |
| 2,396,044 | Fox | Mar. 5, 1946 |
| 2,399,325 | Condon | Apr. 30, 1946 |
| 2,403,289 | Korman | July 2, 1946 |
| 2,420,342 | Samuel | May 13, 1947 |

FOREIGN PATENTS

| Number | Country | Date |
| --- | --- | --- |
| 116,609 | Austria | Mar. 10, 1930 |

OTHER REFERENCES

"Short Wave and Television," April 1938, pages 669, 706, 707. Copy in Div. 48.